US006920430B1

(12) United States Patent
Berton et al.

(10) Patent No.: US 6,920,430 B1
(45) Date of Patent: Jul. 19, 2005

(54) METHOD AND SYSTEM FOR AN ELECTRONIC PROCUREMENT SYSTEM FOR STATE GOVERNMENTS

(75) Inventors: Robert M. Berton, Raleigh, NC (US); Michael J. Huggins, Atlanta, GA (US); Jeffrey L. Eglen, Isle of Palms, SC (US); Charles H. Cooper, Cary, NC (US)

(73) Assignee: Accenture LLP, Palo Alto, CA (US)

( * ) Notice: Subject to any disclaimer, the term of this patent is extended or adjusted under 35 U.S.C. 154(b) by 177 days.

(21) Appl. No.: 09/668,849

(22) Filed: Sep. 22, 2000

(51) Int. Cl.[7] .............................................. G06F 17/60

(52) U.S. Cl. ........................................ 705/26; 705/37

(58) Field of Search .............................. 705/26, 27, 37

(56) References Cited

U.S. PATENT DOCUMENTS

| | | | |
|---|---|---|---|
| 5,758,327 A | * 5/1998 | Gardner et al. ................ 705/26 |
| 5,970,475 A | 10/1999 | Barnes et al. | |
| 6,151,589 A | * 11/2000 | Aggarwal et al. ............. 705/37 |
| 6,351,738 B1 | * 2/2002 | Clark ............................ 705/37 |

OTHER PUBLICATIONS

SiCommnet (sicomm.net) web site information—retrieved via "Wayback Machine" ; Feb. 2, 1999.*
"Auctions Pay Dividends for Gov't"; L. S. Tillet; News relies; May 2000; www.internetwk.com/story; 4 pgs.*
"Colorado and Utah Announce Intent to Award E–Procurement Contract to NIC Commerce", PR NEWSWIRE; New York; Sep 1, 2000.*
"Bank of America and NIC Commerce Form Company to provide E—Commerce Solutions to State and Local Governments", PR NEWSWIRE; Jul. 6, 2000.*
RFP # 194:0–12 RPB released Jun. 1, 2000.*
"NIC Launches Industry's First Comprehensive Suite of eGovernment Solutions For Citizens, Business and Government"; PR Newswire; New York; Jun. 1, 2000.*
NICUSA web pages captured via the WayBack Machine.*
Today's News, "Auctions Pay Dividends for Gov't", L. Scott Tillet, May 10, 2000.*
"NIC Launches Industry's First Comprehensive Suite of eGovernment Solutions For Citizens, Business and Government"; PR Newswire; New York; Jun. 1, 2000 (hereafter referred to as NIC I) and NICUSA web pages captured via the WayBack Machine (archieve.org).*
"For State of Washington AMS Buy Plan Mode lots of Sense State of Washington awards two–year e–procurement solution contract to American Management Systems"; Washington Technology; p. 40; Jul. 3, 2000.*
SiCommNet web pages captured via the WayBackMachine (archieve.org).*
Sicommnet (sicomm.net) web site information—retrieved via the "WayBack Machine"; Feb. 2, 1999.*
"For State of Washington AMS Buy Plan Made lots of Sense State of Washington awards two–year e–procurement solution contract to American Management Systems"; Washington Technology; p. 40; Jul. 3, 2000.*
"NIC Launches Industry's First Comprehensive Suite of eGovernment Solutions For Citizens, Business and Government"; PR Newswire; New York; Jun. 1, 2000.*

(Continued)

Primary Examiner—Wynn W. Coggins
Assistant Examiner—R. E. Rhode, Jr.
(74) Attorney, Agent, or Firm—Hogan & Hartson LLP (57) ABSTRACT

A system is disclosed for providing electronic procurement services to a state government agency at a price to the government agency which will permit the government agency to share in savings resulting from using proven internet-based services and existing procurement subsystems, and supporting service related fees from participating vendors and customers.

16 Claims, 8 Drawing Sheets

OTHER PUBLICATIONS

"Wareforce.com broadens service offerings to counties", Natnl. Assoc. of Counties, Washington, DC. vol. 32, No. 1, Jan. 2000, 7 pgs.

"Cool Companies: E–Commerce", www.cool-companies.org/ecom/index2.cfm, downloaded Dec. 8, 2000, 16 pgs.

L. S. Tillett, "Auctions Pay Dividends for Gov't", News relies, May 2000.

"State to roll out Internet–based procurement system", www.bizjournals.com/baltimore/stories/2000, downloaded Dec. 8, 2000, 1 pg.

"eMaryland Marketplace", www.emarylandmarkplace.com/index2.htm, downloaded Dec. 8, 2000, 1 pg.

* cited by examiner

Figure 1

100 ⟹ Typical Internet Network Configuration

*Figure 2*

200 Typical General Purpose Computer/

800 ⟹ eProcurement System Architecture

METHOD AND SYSTEM FOR AN ELECTRONIC PROCUREMENT SYSTEM FOR STATE GOVERNMENTS

TECHNICAL FIELD

This invention relates to the field of electronic procurement systems. More particularly, the present invention relates to a method and system for an electronic procurement system for state governmental use.

BACKGROUND ART

A technical problem presently exists in the attempt to use modern day computing technology in state governments. Generally the problems facing state agencies when they attempt to upgrade their systems are the same as those facing any business today. That is, huge investments in legacy data processing systems and personnel training cannot be discarded and quickly replaced with more modern Internet-based, business-to-business type systems without large expenditures of time and money. In state governments these problems are exacerbated by the difficult and time-consuming legislative appropriations process. Data processing operating and development budgets are typically prepared annually by each State Agency with some states consolidating these types of budgets into one Information Technology Services budget. However, the requests for more and more budgeted funds to develop new eCommerce systems are becoming increasingly more difficult to get quickly considered by the various agencies, departments and bureaus of the state, and ultimately considered and passed by the legislative budget and spending committees. Moreover, recent highly publicized expensive system development failures, such as one state's $50 million dollar Department of Motor vehicle Registration System which failed to work, make the legislators reluctant to spend the time to try to be assured that a proposed new data processing system will work, and will be as cost effective as proposed.

Accordingly there is a need for a new funding model wherein the services suppliers can partner with the state to make use of currently existing portals, processing facilities and eCommerce services such as electronic payment processing, auctioning, calendaring, etc., whereby this partnering can benefit both the state through lower development and operating costs, and benefit the service provider through development and service fees funded partially by the state and partially by the vendors and clients doing business with the state. Such a model could ease the budgeting burden on the state for development systems by using already existing eCommerce systems of the service provider and can provide operational funding to the service provider through lower usage fees to the state and through new fees paid by the vendors and other clients of the state services.

One of the areas of State Government which has been partially automated in some states and for some time is the area of procurement of state supplies. Supplies ranging from motor vehicles purchase and registration, to office furniture and supplies, to special supplies to particular agencies like police departments, fire and public safety departments, jails, courts and other related legal services The consolidation of many of these services has not been possible in the past generally because of the legacy investments and high cost of replacement systems. Internet-based eCommerce systems have made this now a tractable problem to solve. For example, as reported in the Wednesday, May 10, 2000 edition of InternetWeek at www.internetwk.com, an article titled "Auctions Pay Dividends for Gov't" points out that the federal government has "plunged into the world of online auctions for buying goods and selling surplus items." The article points out that "online auctions will reduce overhead" . . . and provide "a means for increas[ing] government buyer's options." The Federal Supply Services (FSS) (which buys $17 Billion annually) auctioned off surplus items last year on the Internet including more than 100,000 items for $260 million using the eBay auction model. The article goes on to indicate the U.S. Navy and the naval Supply Systems Command is using existing eCommerce systems to save tax dollars in procurements and improve service to their customers, reporting in one instance a saving of 29% from a budgeted $3.3 million purchase of ejector seat components.

These is a need in the art for a system and method for a new model of Internet-based procurement systems which can minimize the state's development costs by using existing Internet proven eCommerce solutions, can save the state money in procurement costs, related overhead costs and can reduce the need for excess budgets, and can gain these benefits through vendor participation fees and client transaction fee usage.

SUMMARY OF THE INVENTION

The present invention provides a solution to the needs described above through a system and method for an Internet-based electronic procurement and funding system for state governments.

A system is disclosed for providing electronic procurement services to a state government agency at a price to the government agency which will permit the government agency to share in savings resulting from using proven internet-based services and existing procurement sub-systems, and supporting service related fees from participating vendors and customers.

A method is disclosed for a state procurement system comprising the acts of providing an Internet-based procurement system for use by a state government agency; providing an internet portal for use by the state government agency to interface with the Internet-based procurement system; providing an internet portal for use by a qualified vendor wishing to sell products to the state agency, the vendor paying a fee to participate in the system, the fee paid to the state agency for use in paying the services provider; and providing the procurement system to the state government agency for a negotiated price to the state government agency designed to generate direct savings to the state government agency.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

BRIEF DESCRIPTION OF THE DRAWINGS

The features and advantages of the system and method of the present invention will be apparent from the following description in which.

DETAILED DESCRIPTION OF THE INVENTION

The present invention provides a solution to the needs described above through a system and method for an Internet-based electronic procurement (hereinafter eProcurement) and funding system for state governments.

Operating Environment

The environment in which the present invention is used encompasses the general Internet-based systems hardware and infrastructure along with well known electronic transmission protocols both conventional and wireless.

Figure 1:
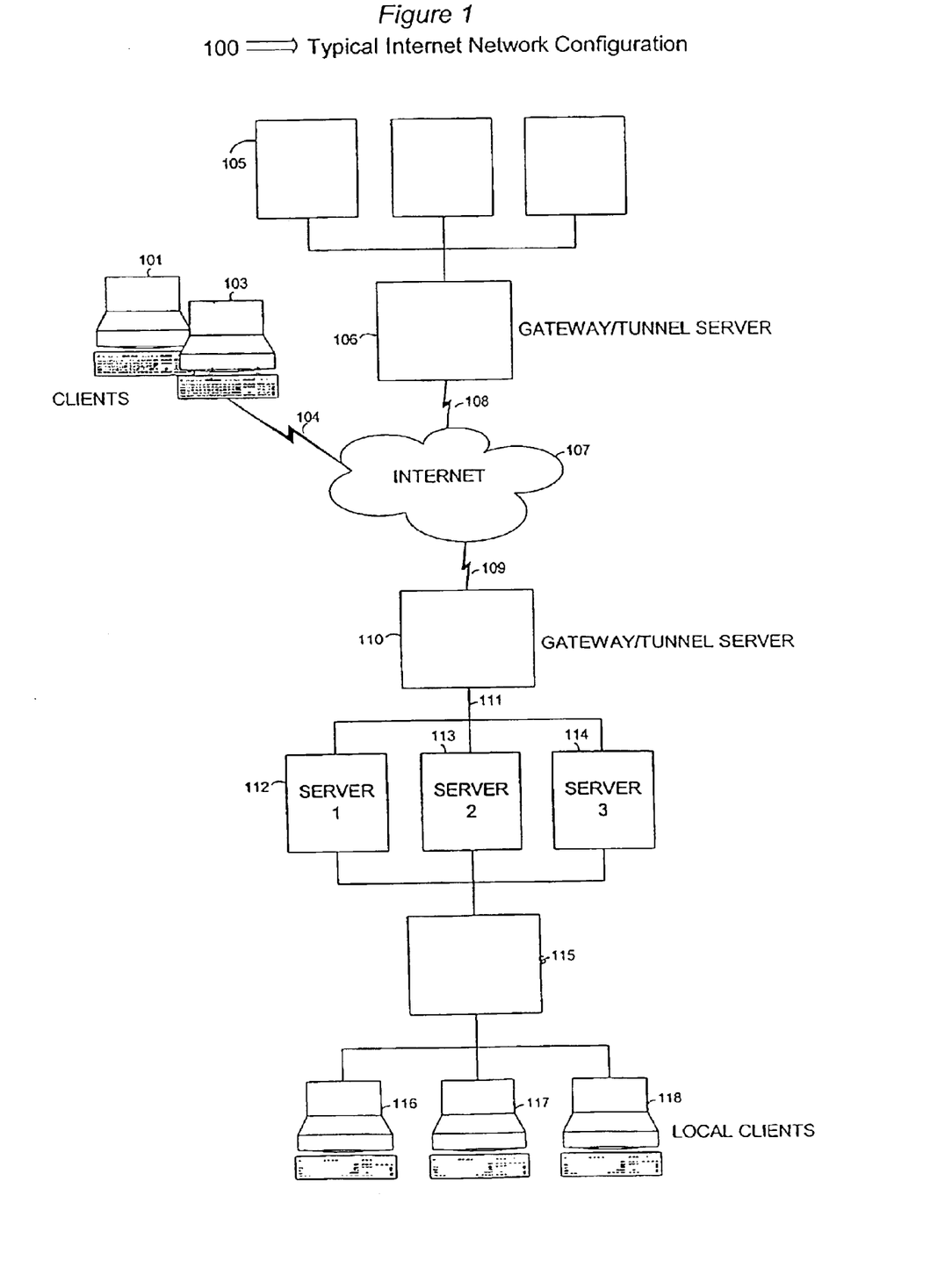
FIG. 1 illustrates an exemplary Internet distributed system configuration.

Some of the elements of a typical Internet network configuration are shown in FIG. 1, wherein a number of client machines 105 possibly in a state government agency, are shown connected to a gateway/hub/tunnel-server/etc. 106 which is itself connected to the internet 107 via some internet service provider (ISP) connection 108. Also shown are other possible clients 101, 103 similarly connected to the internet 107 via an ISP connection 104, with these units communicating to possibly a vendor office via an ISP connection 109 to a gateway/tunnel-server 110 which is connected 111 to various enterprise application servers 112, 113, 114 which could be connected through another hub/router 115 to various local clients 116, 117, 118. Any of these servers 112, 113, 114 could function as an eProcurement server of the present invention, as more fully described below.

Figure 2:
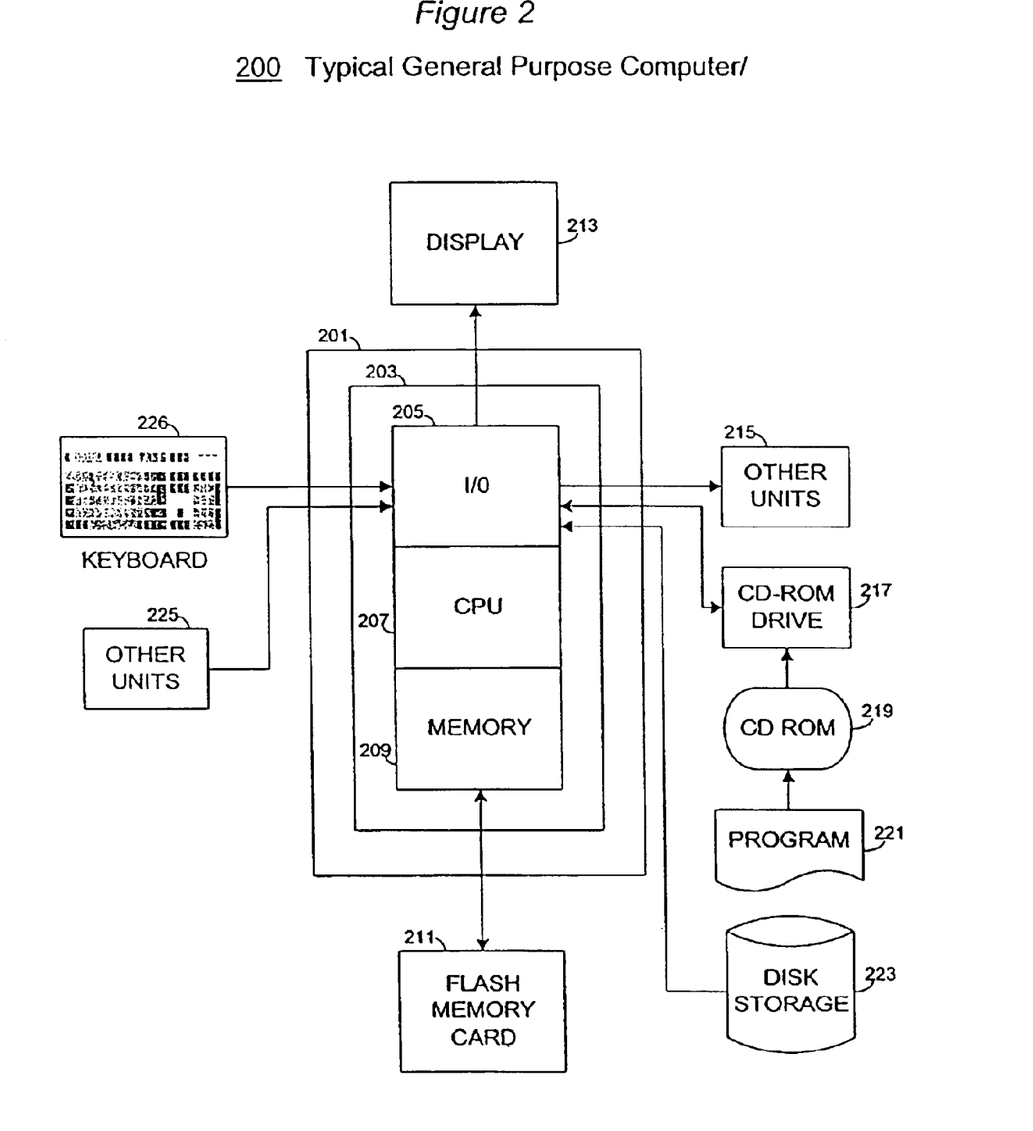
FIG. 2 illustrates a representative general purpose computer server configuration.

An embodiment of portions of the eProcurement System of the present invention can operate on a general purpose computer unit which typically includes generally the elements shown in FIG. 2. The general purpose system 201 includes a motherboard 203 having thereon an input/output ("I/O") section 205, one or more central processing units ("CPU") 207, and a memory section 209 which may have a flash memory card 211 related to it. The I/O section 205 is connected to a keyboard 226, other similar general purpose computer units 225, 215, a disk storage unit 223 and a CD-ROM drive unit 217. The CD-ROM drive unit 217 can read a CD-ROM medium 219 which typically contains programs 221 and other data. Logic circuits or other components of these programmed computers will perform series of specifically identified operations dictated by computer programs as described more fully below.

Figure 3:
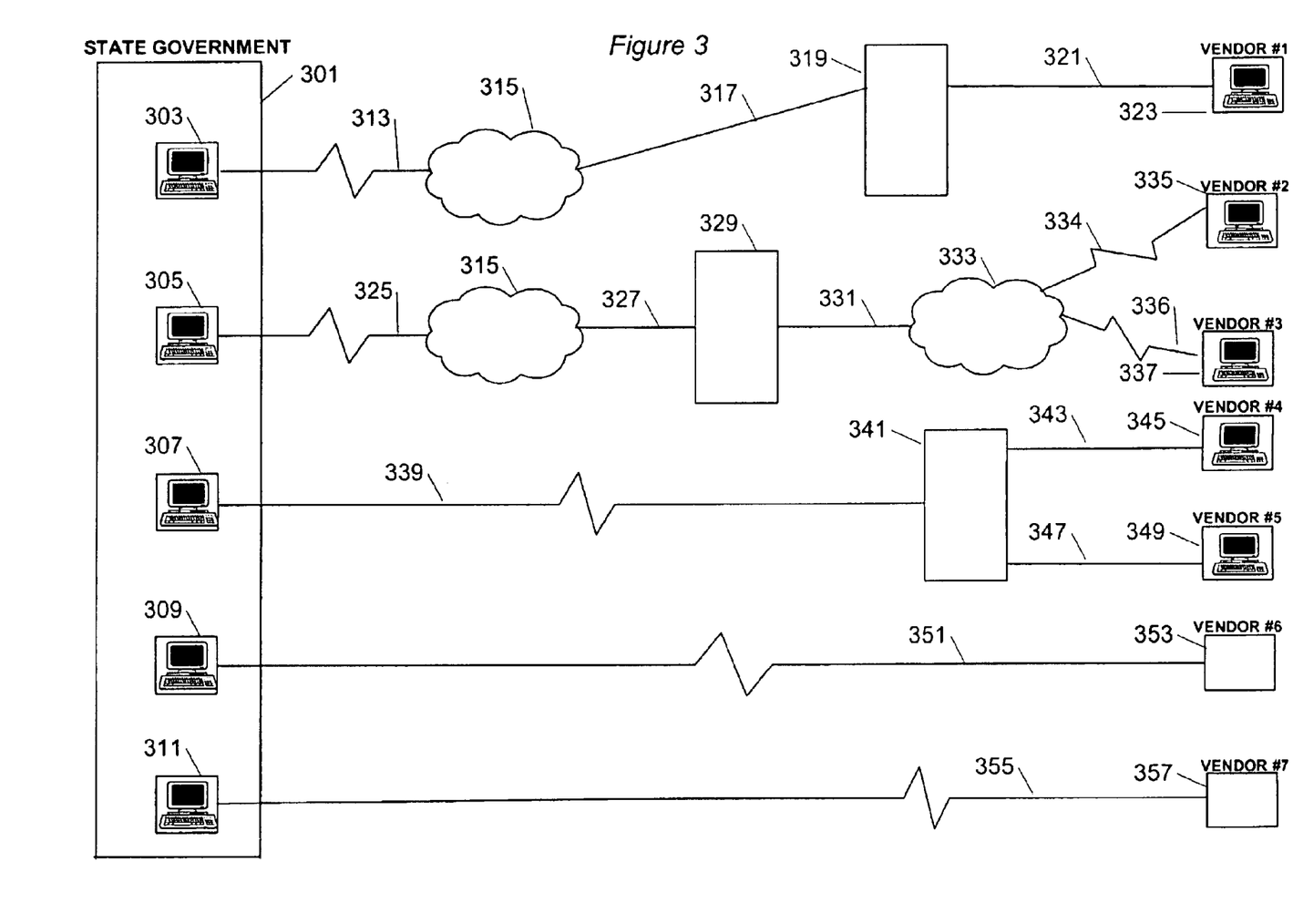
FIG. 3 illustrates a block diagram of the general prior art system of procurement by state governments today.

A typical configuration of eProcurement functions performed in the prior art is shown in FIG. 3. In FIG. 3 an exemplary state government 301 is shown with a plurality of agencies 303–311. These various agencies make use of almost every combination of interface with their clients, customers and vendors.

Also shown are a plurality of vendors 323, 335, 337, 345, 349, 353 and 357. These vendors typically are required to be qualified by the state (much like the Federal Supply Catalogue System) whereby items sold and their prices are made available to state purchasers, who can select which item and from which qualified vendor they may purchase the item. The connection from the various agencies to the various vendors ranges from U.S. Mail or facsimile, as indicated in connection 355 from agency 311 to vendor #7 357. Some agencies (such as 307) may be hard wired to the data processing system 341 of a vendor 345 or 349. Some agencies 303 have Internet connections 313, 315, 317 to a legacy data processing system 319 at a vendor 323. And some agencies like 305 may have Internet connections 325, 315, 327 to a service provider 329 which also can have Internet connections such as 331, 333, 334 to vendor #2 335, and such as 331, 333, 336 to vendor #3 337. Moreover, such systems have no mechanisms for auctioning surplus state agency supplies over these networks. Neither is it usual for some of the plurality of agencies to consolidate purchases over multiple vendors because of the inflexible procurement channels.

The Invention

Figure 4:
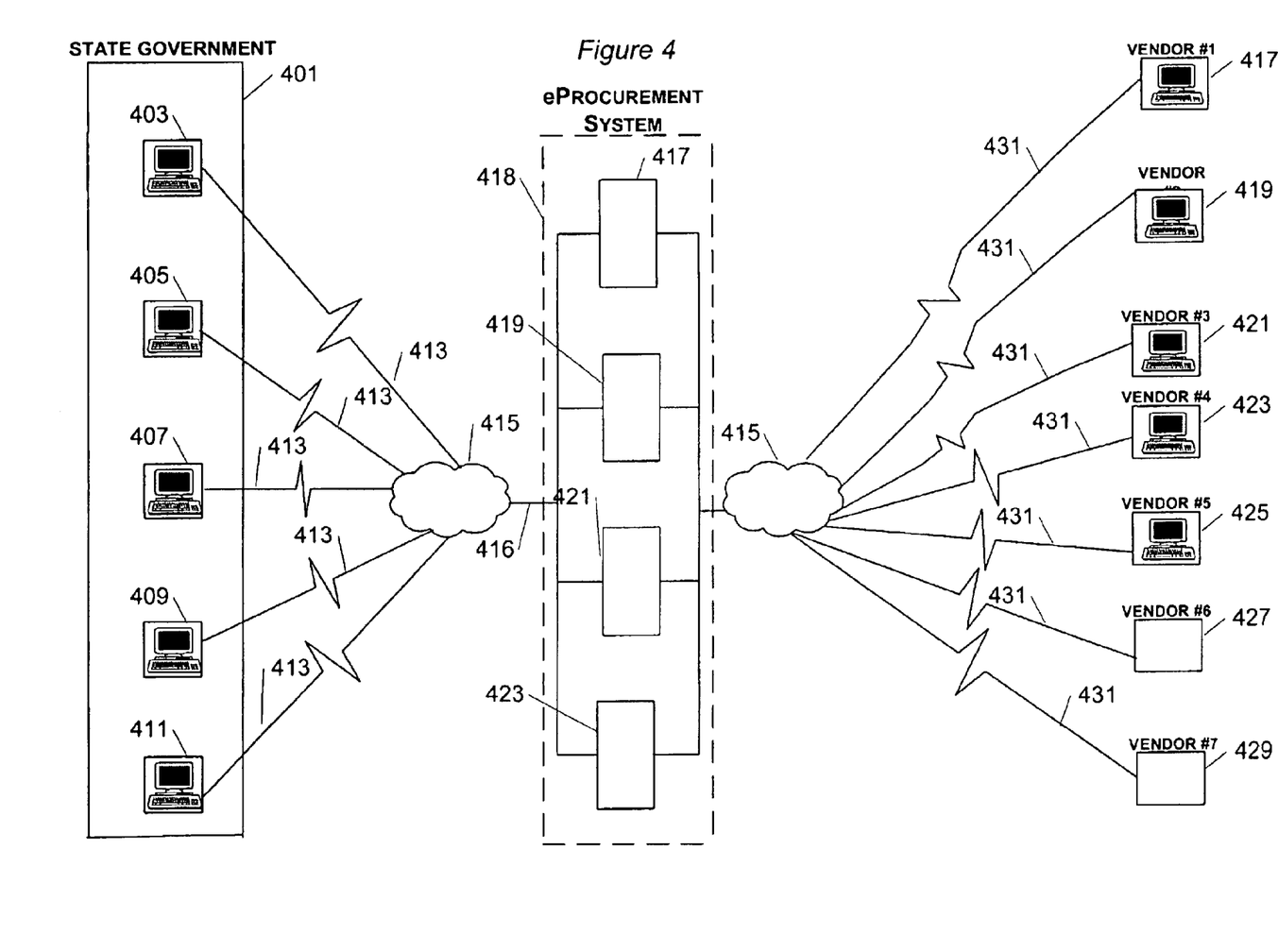
FIG. 4 illustrates a block diagram of a preferred embodiment of the process of state Internet-based procurement of the present invention.

Referring now to FIG. 4 a preferred embodiment of the state government eProcurement system is depicted. In FIG. 4 in an exemplary state government 401 a number of state government agencies 403, 405, 407, 409, 411 are shown, with each agency connected via an electronic communications channel 413 to the Internet 415, which in turn is connected via a communications channel 416 to an exemplary eProcurement system 418. The eProcurement system 418 is comprised of a number of server systems 417, 419, 421, 423 which may be interconnected and which contain the logic means for coupling the state government agencies to a vendor or customer, for providing the procurement means for buying and selling goods or services electronically, including electronic contracting and payment mechanisms, inventory control mechanisms, order tracking mechanisms and the like. The eProcurement system 418 is also electronically connected to the Internet 415 for subsequent connection to various qualified vendors or state customers 417,419, 421, 423, 425, 427, 429. Those skilled in these arts will recognize that exemplary communications channels 413, 431 to and from the Internet 415 may be hard wired or wireless communications channels using any of a number of well known communications protocols.

Figure 5:
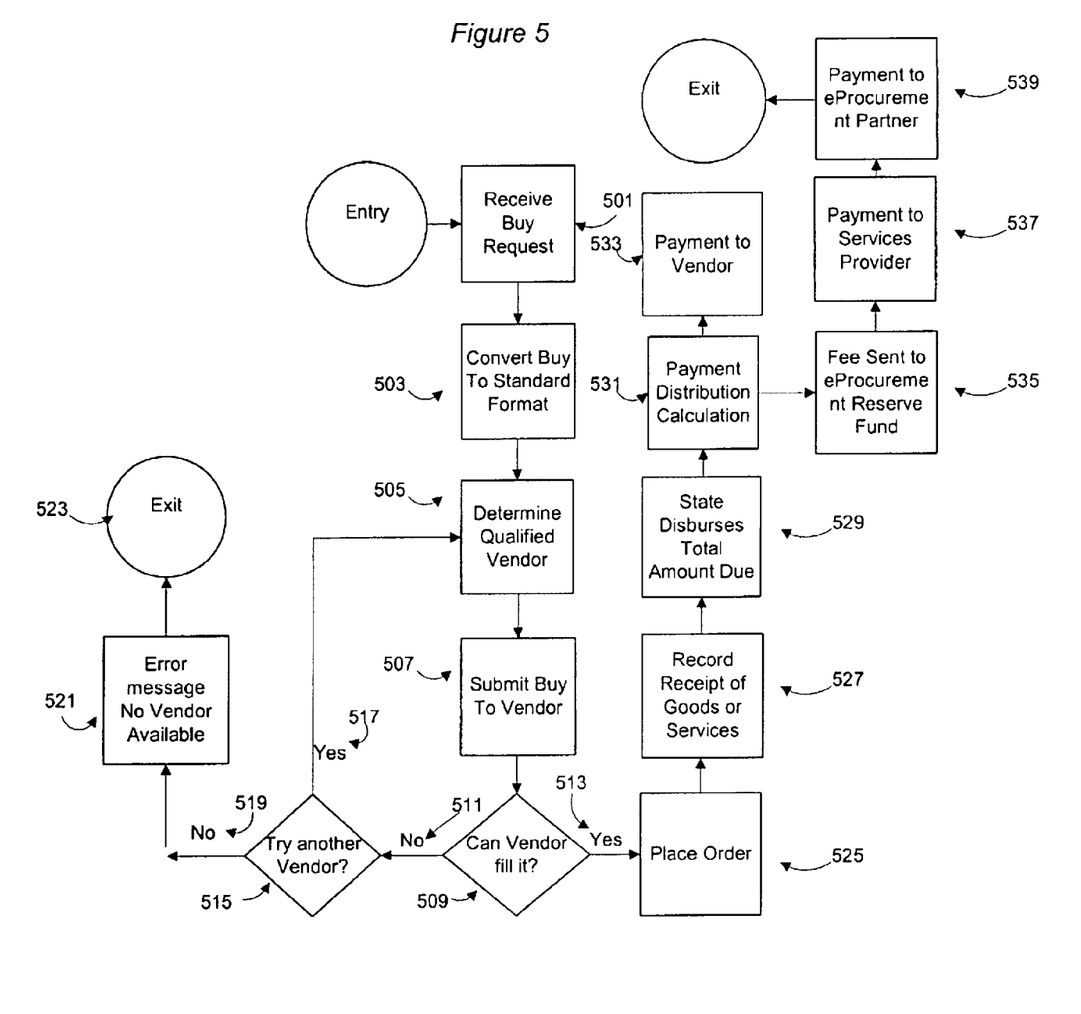
FIG. 5 illustrates a chart of a preferred embodiment depicting the general functional data flow in the procurement system.

Referring now to FIG. 5 an exemplary transaction is described. In FIG. 5 when a purchase request is received 501 from a state government agency, the request may be in any number of formats and/or protocols. The purchase request is converted to a standard format and protocol 503 and a qualified vendor is located 505. A request is submitted to the determined vendor 507 and a determination is made as to whether the specified vendor call fill the order 509. If the vendor cannot 511 another vendor will be selected if possible 517 and the request submitted 507 again. If another vendor cannot be found 519 the requesting state government agency will be notified 521, 523. If the selected vendor can fill the order 513 the order is placed 525 and order tracking records are written. Once the goods/services have been received and accepted 527, accounting entries are set up for the cost to the agency to disburse funds 529, and payment is made using the business model rules calculation 531 for the amounts due to the vendor 533 and the fee amounts to be put into the eProcurement Reserve Fund 535. The fees due to Accenture™ per the business model are distributed 537 and the distribution is made to the eProcurement Service Provider partner 539.

Figure 6:
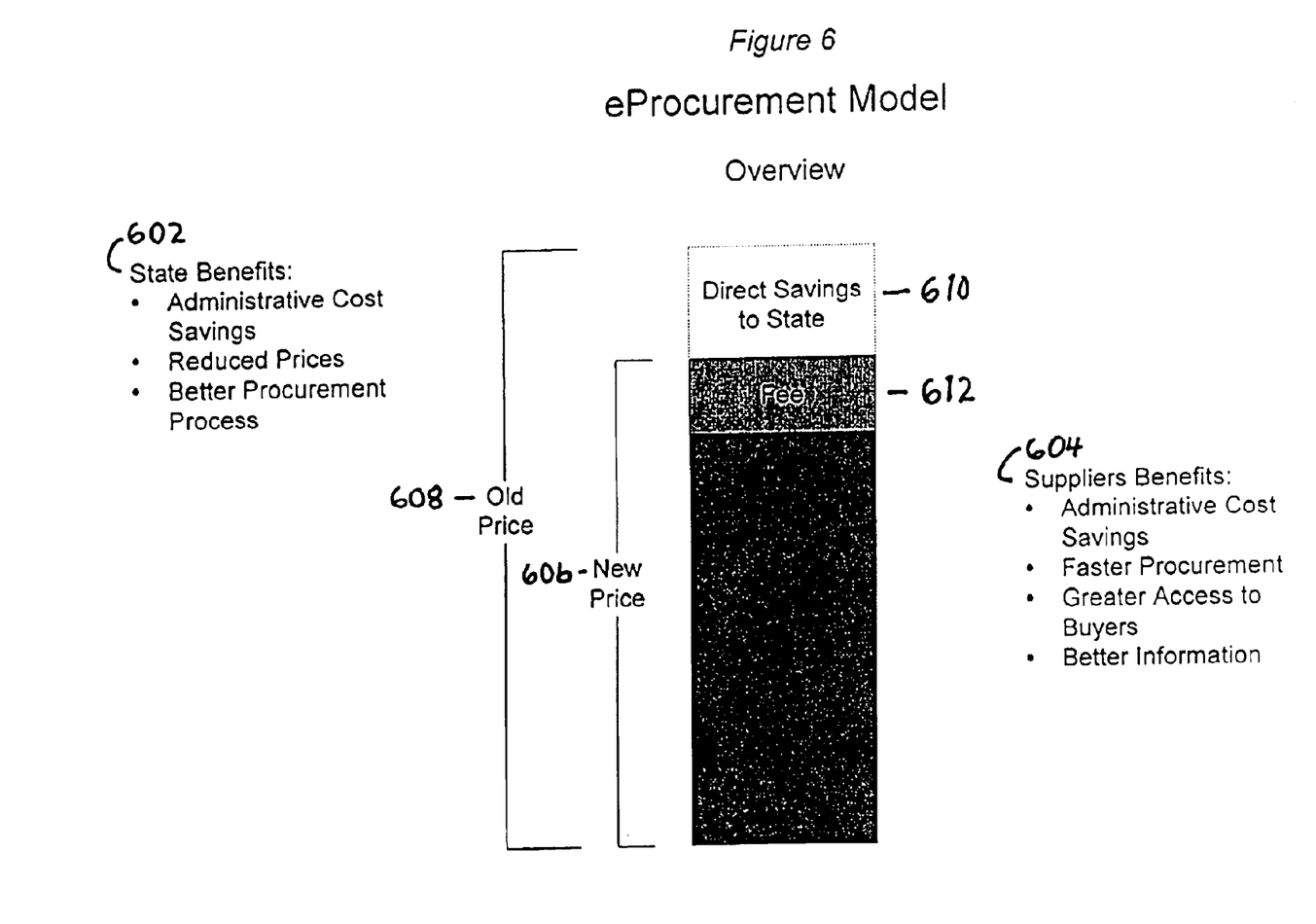
FIG. 6 illustrates an overview chart of an eProcurement Model of the present invention.
Figure 7:
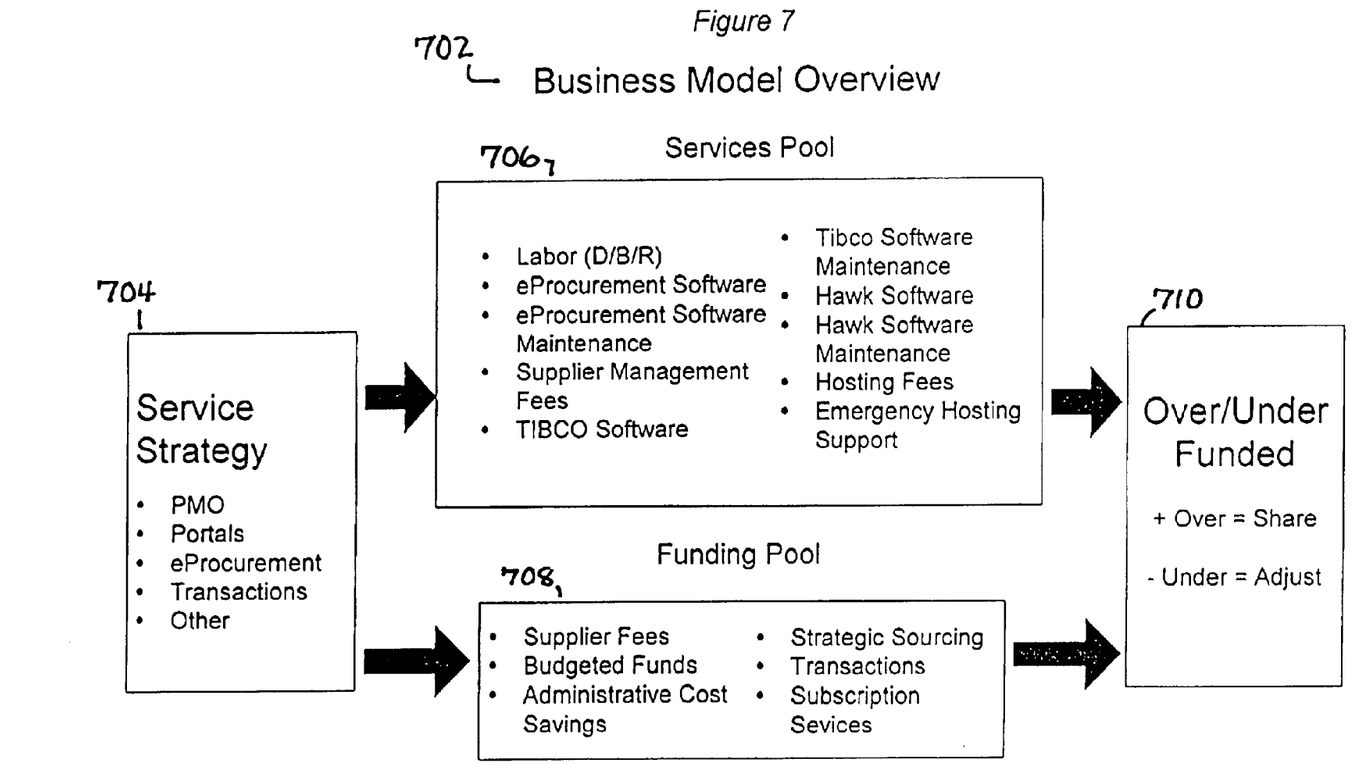
FIG. 7 illustrates a chart of a Business Model Overview of the present invention.

Referring now to FIGS. 6 and 7 a general description of the Business Model and its objectives is presented.

To illustrate these objectives, FIG. 6 shows an overview that shows state benefits 602 and supplier benefits 604 for certain embodiments of the present invention. State benefits 602 may include administrative cost savings, reduced prices and a better procurement process generally. Supplier benefits 604 may include administrative cost savings, faster procurement, greater access to buyers and better information generally. In particular, these benefits can include a "new" 606 (i.e., under an embodiment of the present invention) that is substantially less than a nominal "old" price 608. This difference between the "new" price 606 and the "old" price 608 can enable a direct savings to the state 610 as well as a fee 612 to support the eProcurement system.

The purpose of the business model is to provide a mechanism for the State to make substantial progress towards the E-Commerce objectives including better citizen and business services at a lower cost. One strategy is to develop a self-funding mechanism to pay for the development and operational services to be provided by the Service Provider. For example, Accenture/Yahoo! team. The self-funding business model that is proposed is targeted to meet a number of key objectives critical to the state's needs.

1) The self-funding model "produces" a new source of funding for the proposed projects. This eliminates the need for a separate budget and requires no-up-front money from the State.
2) Allows for the delivery of the statewide business, citizen and employee portals.
3) Provides the State with a strong coordinated management approach to the E-Commerce activities of the State.
4) Provides an important and much needed E-Procurement capability substantially faster than otherwise possible.
5) Provides very efficient access to already developed E-Commerce capabilities such as electronic payment processing, auctioning, calendars, etc.
6) Provides an attractive and "sticky" solution that not only will attract interest to the portals but will entice users to be engaged based on the additional content and capabilities provided. A key to the success of E-Commerce initiatives is to get the users to the site. Integration of well known Internet Service Providers with the State Portals provides the foundation to increase attractiveness and accessibility.

The proposed business model framework is described below. It will be necessary as a state government agency begins to use the system for the agency to validate the model, have input into the proposed assumptions, and mutually create the best business model for the State. The final business model must be agreed upon in writing by the State and the Services Provider team.

The business model can be broken down into two basic components: 1) services to be provided and 2) funding sources. The objective is to identify and generate funding sources to cover the cost of providing the services in the business model. The business model should provide a flexible means to adjust the components to reach a mutually agreed upon balance between funding sources and services provided.

FIG. 7 shows a preferred business model overview 704 according to the present invention. A service strategy 704 relates relevant entities and processes to a more specific services pool 706 and a more specific funding pool 708 together with a mechanism 710 for managing over-funded and under-funded services.

The service strategy 704 may include the following service-related entities and processes:

1) Project Management Office (PMO)—This would include the resources to assist in the management of the E-Commerce office for the duration of the contract.
2) State Portals—This would include the design, build and running of the State Portals for businesses, citizens and state employees for the duration of the contract. Running of the statewide portal includes the hosting of portal operations including hardware, software and operations support and the Help Desk support.
3) E-Procurement—This would include the design, build and running of the statewide E-Procurement system including a trade exchange capability. Similar to the State Portals it includes the hosting of this capability and the Help Desk support.
4) Transactions—This would include the processing of mutually selected transactions to be developed as part of the E-Commerce initiatives such as licensing, registration etc. These transactions could be developed by the State, other vendors, or, if the State desires, by the Services Provider team. This integration of transactions would then be incorporated under the portal services described above. In other words, this model does not assume all transactions would be developed by the Services Provider team.
5) Other Initiatives—There may be other initiatives that arise from time to time that the State would want to include. Based on the revenue being generated this may a) be incorporated and have no net effect on the business model, b) require a change in parameters in the funding sources (e.g. increased supplier fee), c) require a change in scope of some of the above projects or other mutually agreed upon changes.

The funding pool 708 may include the following:

1) Budgeted Funds—Existing or new budgeted funds could be used to fund the services of the Electronic Commerce Project Office or State Portal.
2) Supplier Fees—Suppliers would pay a minimum fee (% of goods and services sold to the State—e.g. 2–4%) to the State for payment to the Services Provider team for all activity conducted using the E-Procurement system. An illustrative example of the projected ramp-up of agencies and the target percentage of all procurement spending processed by the E-Procurement system, to be confirmed during a start-up period, would be as follows:

| Agencies | Month 6 | Month 12 | Month 18 | Month 24 | Month 36 |
| --- | --- | --- | --- | --- | --- |
| ITS (pilot) Executive Branch | 10% | 60% | 70% | 70% | 70% |
| Group 1 | 0% | 20% | 40% | 60% | 70% |
| Group 2 | 0% | 0% | 20% | 40% | 60% |
| Group 3 | 0% | 0% | 10% | 30% | 60% |

In the above example, suppliers to ITS would begin participating in the E-Procurement system during a six-month pilot. The supplier price would include a fee paid to the state for later payment to the Services Provider team based on the dollar value of E-Procurement transactions. The State would be responsible for generating the agencies' participation at the targeted levels.

3) Strategic Sourcing—Strategic Sourcing is a technique used to obtain the same or similar goods and services to the State at a lower cost than is currently being paid. This is accomplished by conducting fact based negotiations using market data and volume purchasing potential. Also, the Services Provider team may have pre-negotiated prices with suppliers which are lower than the State's current price. Savings generated through strategic sourcing will be accrued to the self-funding pool. A ceiling for strategic sourcing savings will be established and savings above the ceiling will be shared with the State.

4) Administrative Cost Savings—Cost savings derived from improved efficiencies resulting from the utilization of E-Procurement automation will provide benefits to the State. Experience has demonstrated a significant savings in procurement costs using E-Procurement. Again, a method would be established for the incorporation of these savings into the self-funding model—e.g. 50% of all savings would be incorporated into the self-funding pool.

5) Transactions—Transactions are intention based activities performed by citizens or businesses in interaction with the State. Examples include licenses, registration, inquiries etc. These transactions may have a fee associated with them and this fee would be part of the self-funding sources.

6) Subscription Services—Subscription services are standard monthly access fees charged users to allow access to a series of services, information or other transactions that improve the efficiency of their interaction with the portal provider. These fees would be part of the self-funding sources as allowed by law.

The services pool 706 may include services related to labor, eProcurement, suppliers, hosting, etc. Services to be provided to the State in the self-funding model would be agreed to by the State and the Services Provider team. The more services to be provided through the self-funding model by the Services Provider team, the greater the commitment by the State to the acquisition of the funding sources identified above. But more importantly the business model provides the framework for self-funding of significant E-Commerce activities. It has been developed with flexibility in mind and is designed to meet the requirements of the State.

The mechanism 710 for managing over-funded and under-funded services may include sharing options for over-funded services and adjustment options for under-funded services. The goal of the self-funding business model is to manage the proper balance of funding sources against the cost of providing services. The business model is an on-going management tool and resource. As the scope of services or other activities change or as the ability to derive funding sources adjust, the State and the Services Provider team will monitor the business model impact. The goals for both parties should be to maintain the incentives for mutual success. The following are examples of business model adjustments that may be required during this project:

1) Excess Funding—To the extent that a surplus is generated or projected, a method for sharing these amounts would be determined during the due diligence period. For example, with strategic sourcing there may be a ceiling set whereby if the sourcing provides savings greater than an established percentage, this excess would be split equally between the State and the Services Provider team.

2) Insufficient Funding—To the extent that a deficit is generated or projected, a method for adjusting to the situation would be determined during the due diligence period. For example, if the State commits to a level of purchases being processed by the E-Procurement system and this level is not reached, a number of options would exist including increasing the supplier fees, a reduction in the scope of services being provided, resources being supplemented by the State (e.g. help desk), infusion of supplemental funding by the State, or some other modification to the business model formula.

A brief description of the E-Procurement solution and a summary of the anticipated roles and responsibilities of each party are as follows:

The E-Procurement solution can, subject to mutual agreement by the State and the Services Provider team:

1. Allow State employees to research, compare and select products from online catalogs, subject to the business rules of the State.
2. Create requisitions for items selected through online shopping.
3. Route requisitions for approval, consistent with State procedures and agency-level business rules, and provide information on requisition status.
4. Transmit approved purchase orders to vendors.
5. Provide automated receipt for delivered items, and include ability to record condition of receipt and vendor performance.
6. Receive electronic invoices and make electronic payment to vendors for items received.
7. Allow State employees to post RFQ and post/receive bid ("reverse auction") documents to selected vendors, and facilitate State evaluation of bids.
8. Allow the State to perform auctions of surplus State property, and other items as appropriate.

Implementation of the E-Procurement solution will be completed in phases. The State and the Services Provider team will agree in advance to the order in which the capabilities are rolled out.

The Services Provider team will:

1. In consultation with the State, choose, hold license to, and customize for the State, an E-Procurement solution based substantially upon an existing leading solution in the marketplace.
2. In consultation with the State, choose, hold license to, and configure the E-Procurement infrastructure, including hardware, software, and database management software, from among the leading solutions in the marketplace, consistent with the State's technical architecture.
3. Host the E-Procurement solution to enable State employee access from the desktop.
4. Reach out to identified State vendors to involve them in the service. Identification of vendors will be done in consultation with the State. High dollar and high transaction volume vendors will be prioritized over low transaction volume vendors.
5. Individually negotiate with selected vendors an appropriate fee that the vendor will pay to the State for its transaction volume through the service.
6. Support the State's desire to include in the E-Procurement service small businesses, disadvantaged businesses, and State-based businesses.

7. Support the State in negotiating with suppliers for additional volume or sourcing discounts, based on E-Procurement spend data. These "strategic sourcing" benefits will be shared by the Services Provider team and the State on a mutually agreed-upon, case-by-case basis.
8. Train an initial group of users on the service, so that they can in turn train other State employees as the service is rolled out.
9. Provide help desk support.

The State will, as allowed by law:
1. Choose the vendors with whom the State wants to do business.
2. Grant to the Services Provider team the exclusive right to provide E-Procurement service to the State for the duration of this contract.
3. Make good faith efforts to transact all applicable purchases through the service.
4. Continue this arrangement for a minimum period of three years. If the State chooses to discontinue the service after three years, a fourth year of service will be required to appropriately transition responsibilities to the State.
5. Mandate vendor participation in the service and vendor payment of fees to the State through the contract and transition period.
6. Guarantee a minimum vendor participation fee (percentage) that each vendor would pay to the State per transaction.
7. Commit to determine a minimum dollar level of transactions through the system for years one, two and three of implementation and the transition period.
8. Provide knowledgeable State resources and cooperation for the integration of applicable State systems.
9. Provide communications and specialists to assist in change management efforts.
10. Train state employees on use of the service.

As a first step toward E-Procurement implementation, the Services Provider team and the State should together complete a due diligence effort to more precisely define the E-Procurement goals for the State. This should take a period of about four weeks after start date. Due diligence tasks include:

1. Develop a detailed financial model for the E-Procurement effort. Information required for this model includes:
   Annual spend ($ and number of transactions) by commodity type.
   Annual spend ($ and number of transactions) by vendor.
   Annual spend by agency ($ and number of transactions by commodity type and vendor).
2. Determine the extent to which ancillary government and non-profit purchasing within the State (units of local government, universities, hospitals, other non-profit or educational agencies) can be incorporated into the service.
3. Estimate percentage take-up of the service for years one, two, and three.
4. Estimate number of State users of the service.
5. Develop a detailed scope statement and work plan for implementation of the E-Procurement service. The scope statement and work plan will define:
   Extent of consulting services required for basic E-Procurement implementation.
   Extent of back-end systems integration necessary for the E-Procurement effort to be a success and required consulting support for integration. No additional integration services are anticipated to facilitate participation by interested ancillary government and non-profit purchasing entities (units of local government, universities, hospitals, etc.).
   Agencies, vendors and commodity types to be prioritized for early phases of E-Procurement implementation.
   Service level agreement.
6. Develop mutual incentives for program success and a methodology to share financial returns in excess of anticipated levels. Returns in excess of anticipated levels could result from any of the following:
   Services Provider negotiates a participation fee from a vendor that exceeds some mutually-agreed level.
   The dollar volume of State purchases through the system exceeds the anticipated level.
   Additional organizations are added (hospitals, units of local government, etc.) and their dollar volume causes the total volume to exceed the anticipated level.

Exemplary System Architecture

Figure 8:
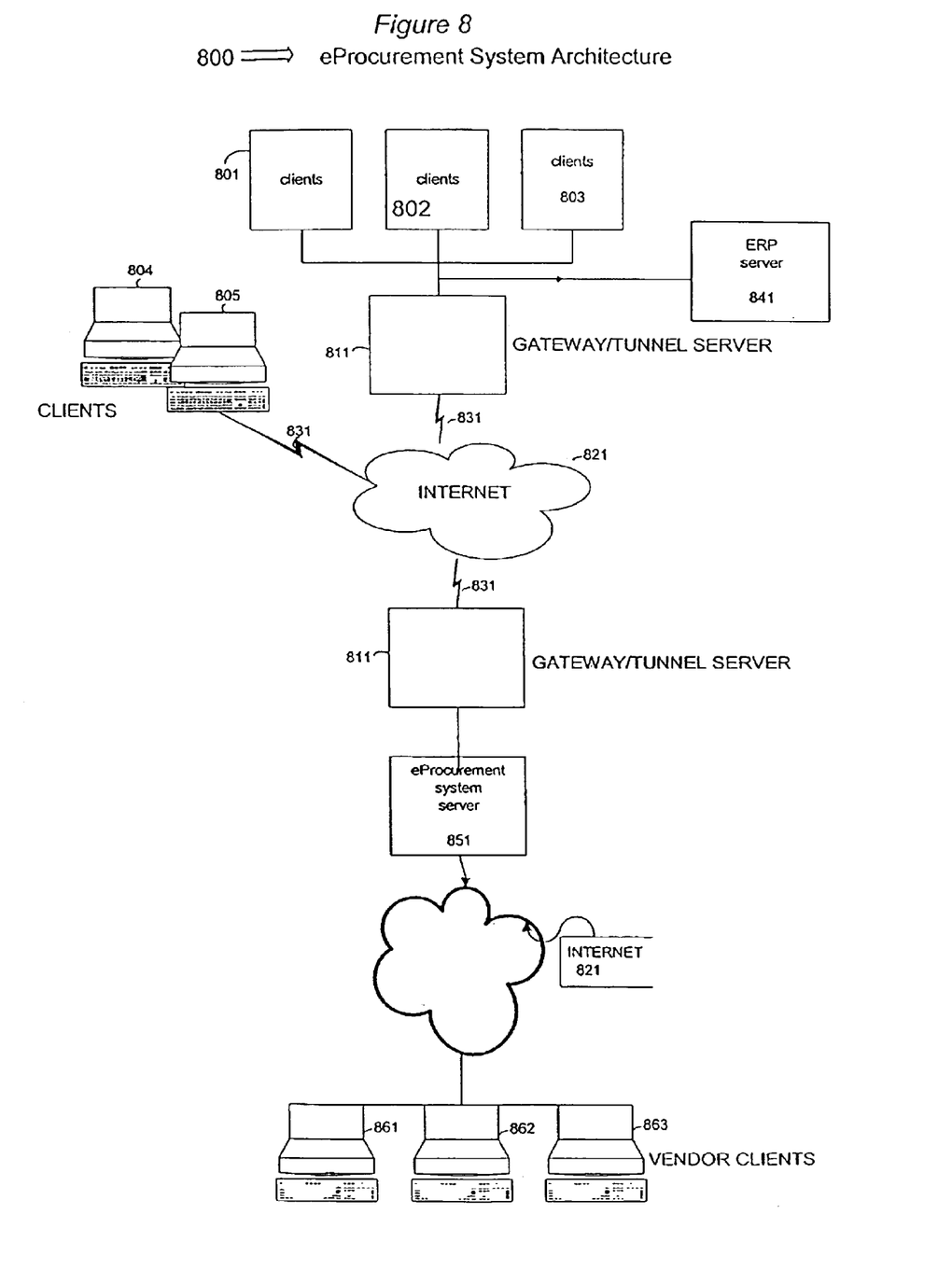
FIG. 8 illustrates a chart of a preferred embodiment depicting a typical architecture configuration of an exemplary eProcurement system showing existing functionalities.

Referring now to FIG. 8 an exemplary system architecture for an to eProcurement system is described. In FIG. 8 a number of client machines 801–805 in a state government agency are shown connected to a Gateway/Hub/Tunnel-server/etc. 811, which is connected to the Internet 821 via some ISP connection 831. Through this ISP a connection is made to the eProcurement system and ERP running the accounting and purchasing modules 841, integrated with the eProcurement trading partner catalogues/supplier information/processes 851, connected via the Internet 821 to the vendor clients 861, 862, 863.

Having described the invention in terms of a preferred embodiment, it will be recognized by those skilled in the art that various types of general purpose computer hardware may be substituted for the configuration described above to achieve an equivalent result. Similarly, it will be appreciated that arithmetic logic circuits are configured to perform each required means in the claims for performing the various features of message recognition, message creation, message storage and connection to a mobile telephony system. It will be apparent to those skilled in the art that modifications and variations of the preferred embodiment are possible, such as different mobile telephony systems may be used, different communications media such as wireless communications, as well as different types of PCDs may be used by addressees and or senders of various types of electronic messages, all of which fall within the true spirit and scope of the invention as measured by the following claims.

We claim:

1. A computer related method for funding a state government procurement system comprising the acts of:
   a. providing an internet-based procurement system by a services provider for use by a state government agency for procurement of goods and services;
   b. providing an Internet portal for use by the state government agency to communicate electronically with the internet-based procurement system;
   c. providing an Internet portal for use by a qualified vendor wishing to sell goods and/or services to the state government agency;
   d. determining payment funds from the state government agency for goods and/or services provided by the vendor;

e. sending a first portion of the payment funds to the vendor;

f. sending a second portion of the payment funds to a reserve fund; and g. sending a provider payment from the reserve fund to the services provider.

2. The method of claim 1 comprising an additional act of providing an Internet portal for a customer of the state government agency, whereby the customer can execute an electronic transaction, via the internet-based procurement system, with the state government agency in exchange for a fee, wherein the customer is one of the group consisting of a person seeking a driver's license, a person seeking a vehicle license, a person seeking a voter registration, a person seeking a license to practice professionally in the state, a person seeking a business registration, a person seeking a sales tax certificate, a person seeking a sales permit and a person seeking a generic state identification document.

3. The method of claim 1 wherein the state government agency is able to use the internet-based procurement system to sell by auction or other methods, obsolete or excess inventory held by the state government agency to interested buyers.

4. The method of claim 1, further comprising:

when an input into the reserve fund exceeds an excess-funding threshold, sending a first portion of a corresponding surplus from the reserve fund to the services provider and sending a second portion of the corresponding surplus to the state government agency; and when an input into the reserve fund falls below an insufficient-funding threshold, carrying out an insufficient-funding revision including at least one of:

reducing the first portion of the payment funds that are sent to the vendor and increasing the second portion of the payment funds that are sent to the reserve fund, reducing the scope of service of the internet-based procurement system, and sending a supplemental payment from the state government agency to the reserve fund.

5. The method of claim 1, further comprising:

sending a development payment from the reserve fund to the services provider for funding development of the internet-based procurement system.

6. The method of claim 1, further comprising:

when an input into the reserve fund exceeds an excess-funding threshold, sending a first portion of a corresponding surplus from the reserve fund to the services provider and sending a second portion of the corresponding surplus to the state government agency.

7. The method of claim 1, further comprising:

when an input into the reserve fund exceeds an excess-funding threshold, carrying out an insufficient-funding revision including at least one of:

reducing the first portion of the payment funds that are sent to the vendor and increasing the second portion of the payment funds that are sent to the reserve fund, reducing a scope of service of the internet-based procurement system, and sending a supplemental payment form the state government agency to the reserve fund.

8. A system for providing Internet-based electronic procurement services to a state government agency, comprising:

a computer having a processor, a memory, a database, and communications connections to the Internet, the computer provided by a services provider;

a first server mechanism coupled to the computer for providing procurement channels between buyers and sellers of goods and services;

a second server mechanism coupled to the first server mechanism for communicating with an Internet portal in the state government agency whereby citizens and other customers of state services can communicate with a state agency; and a third server mechanism coupled to the computer for communicating with a qualified vendor of goods or services, wherein the computer includes executable commands for:

determining payment funds from the state government agency for goods and/or services provided by the vendor;

sending a first portion of the payment funds to the vendor;

sending a second portion of the payment funds to a reserve fund; and sending a provider payment from the reserve fund to the services provider.

9. The system of claim 8, wherein the computer further comprises executable instructions for:

when an input into the reserve fund exceeds an excess-funding threshold, sending a first portion of a corresponding surplus from the reserve fund to the services provider and sending a second portion of the corresponding surplus to the state government agency.

10. The system of claim 8, wherein the computer further comprises executable instructions for:

when an input into the reserve fund falls below an insufficient-funding threshold, carrying out an insufficient-funding revision including at least one of:

reducing the first portion of the payment funds that are sent to the vendor and increasing the second portion of the payment funds that are sent to the reserve fund, reducing a scope of service of the internet-based procurement system, and sending a supplemental payment from the state government agency to the reserve fund.

11. The system of claim 8, wherein the computer further comprises executable instructions for:

when an input into the reserve fund exceeds an excess-funding threshold, sending a first portion of a corresponding surplus from the reserve fund to the services provider and sending a second portion of the corresponding surplus to the state government agency; and when an input into the reserve fund falls below an insufficient-funding threshold, carrying out an insufficient-funding revision including at least one of:

reducing the first portion of the payment funds that are sent to the vendor and increasing the second portion of the payment funds that are sent to the reserve fund, reducing a scope of service of the internet-based procurement system, and sending a supplemental payment from the state government agency to the reserve fund.

12. A system for implementing a computerized eProcurement system for a state government agency, comprising:

a server computer hosting an eProcurement system accessible via client computers to a plurality of state government agencies who comprise potential buyers of goods and/or services said eProcurement system including a user interface (UI) comprising controls whereby a state government agency user selects criteria and a display whereby results are displayed;

a database of information electronically coupled to the server computer concerning goods and services available from a plurality of a qualified vendors;

wherein said eProcurement system is available via the Internet to assist a state government agency buyer in locating a product or service of interest and in locating a specific qualified vendor, and the server computer includes executable instructions for:

determining payment funds from the state government agency for goods and/or services provided by the vendor;

sending a first portion of the payment funds to the vendor;

sending a second portion of the payment funds to a reserve fund; and sending a provider payment from the reserve fund to a services provider of the eProcurement system.

13. The system of claim 12 wherein the computerized eProcurement system for a state government agency is provided by a services provider for use by the state government agency for procurement of goods and services, where the computerized eProcurement system is funded by fees comprising payments from participating venders, payments by investment from the services provider, and payments by transaction fees collected from customers comprising persons seeking services from a state agency through use of the computerized eProcurement system.

14. The system of claim 12, wherein the server computer further comprises executable instructions for:

when an input into the reserve fund exceeds an excess-funding threshold, sending a first portion of a corresponding surplus from the reserve fund to the services provider and sending a second portion of the corresponding surplus to the state government agency.

15. The system of claim 12, wherein the server computer further comprises executable instructions for:

when an input into the reserve fund falls below an insufficient-funding threshold, carrying out an insufficient-funding revision including at least one of:

reducing the first portion of the payment funds that are sent to the vendor and increasing the second portion of the payment funds that are sent to the reserve fund, reducing a scope of service of the internet-based procurement system, and sending a supplemental payment from the state government agency to the reserve fund.

16. The system of claim 12, wherein the server computer further comprises executable instructions for:

when an input into the reserve fund exceeds an excess-funding threshold, sending a first portion of a corresponding surplus from the reserve fund to the services provider and sending a second portion of the corresponding surplus to the state government agency; and when an input into the reserve fund falls below an insufficient-funding threshold, carrying out an insufficient-funding revision including at least one of:

reducing the first portion of the payment funds that are sent to the vendor and increasing the second portion of the payment funds that are sent to the reserve fund, reducing a scope of service of the internet-based procurement system, and sending a supplemental payment from the state government agency to the reserve fund.

* * * * *